UNITED STATES PATENT OFFICE.

ERNEST LESLIE RANSOME, OF SAN FRANCISCO, CALIFORNIA.

MANUFACTURE OF BRICKS.

SPECIFICATION forming part of Letters Patent No. 447,972, dated March 10, 1891.

Application filed April 17, 1889. Serial No. 307,575. (No model.)

*To all whom it may concern:*

Be it known that I, ERNEST LESLIE RANSOME, of the city and county of San Francisco, State of California, have invented an Improvement in the Manufacture of Bricks; and I hereby declare the following to be a full, clear, and exact description thereof.

Under the process of manufacturing unburned bricks which is described in the patent granted to me in July, 1885, No. 322,559, a chemical action takes place between the lime or its equivalent and the silica of the ashes or their equivalent, which are used in the manufacture of the bricks. Such chemical action results in the hardening of the bricks, and this action is necessary to the success of the process, both as the same is described in my former patent and as I have now improved it.

My present invention includes the discovery that the chemical action mentioned will be greatly facilitated if the bricks are immersed in water after they are molded and pressed; also, in the further discovery that such chemical action will be still further accelerated by having present in the material during such chemical action some of the soluble alkaline salts which naturally exist in the ashes of ordinary wood or coal; also, in the discovery that by the treatment herein described a valuable solution of soluble salts can be incidentally and cheaply produced as a by-product during the manufacture of the unburned bricks.

Under the process described in my above-mentioned patent the soluble salts which were contained naturally in the ashes were removed before the material was molded. Under that patent the molded bricks were not immersed in water.

In my present improved process or method of treatment I mix the ashes with the lime, as described in my above-mentioned patent, except that the ashes are not washed. The mixed material is then moistened just enough to make it adhere together in a mass. In this condition the material is molded and pressed into bricks, blocks, and other forms, as desired. Ordinary skilled workmen will readily know how to mold and press the molded forms without further direction. By exposing these molded and pressed bricks or blocks while they are moist to the atmosphere they will soon become sufficiently hard to endure immersion in a water bath without danger of being disintegrated thereby. When the bricks are thus sufficiently hardened, I immerse them in batches in baths of water.

It is necessary that all the soluble salts should be extracted from these bricks at some time during their manufacture, as the long-continued presence of these salts in the bricks would ultimately produce deleterious results. It is better that the bricks should remain in water until the necessary chemical action, which must take place between the silica of the ashes and the lime or cement which is used, is finished, as the chemical action will not go on to any appreciable extent unless the material is wet or moist. The sooner this chemical action is completed the sooner the bricks will be completed and ready for use. It is desirable, therefore, to hasten such chemical action as much as possible without extra cost. The presence of the soluble salts of the kind mentioned in some quantity, however small, will assist the chemical action and hasten its ultimate perfection. For this reason it is better to retain some portion of the soluble salts in the bricks until the chemical action is about completed. If fresh water is constantly applied to the bricks, the soluble salts will be extracted long before the chemical action is completed, and the finishing of the bricks will be thereby retarded. At the same time if the soluble salts are all left in the bricks until the chemical action is completed time will be lost in subsequently keeping the bricks in water to effect the necessary extraction of the soluble salts from them. Time is therefore most economized by so regulating the treatment that the removal of the soluble salts will be completed at the same time that the chemical action is completed. This result may be accomplished by allowing each batch of bricks to remain in its bath of water after the water has absorbed from the batch so much of the soluble salts that the water and the bricks are each equally with the other impregnated with the salts. While the water and the bricks are equally impregnated with the salts, the extraction of the salts from the bricks will cease, but the chemical action will continue.

When the chemical action has proceeded far enough to make it judicious to do so, the water may be changed and fresh water applied to the batch of bricks, so as to again allow the extraction of the salts from the bricks to proceed. By proceeding in this manner the treatment can be conducted so as to have the removal of the soluble salts and the chemical action both completed at the same time.

In order to produce from the process a solution of the soluble salts of commercial value, I change the method of applying the water-baths to the batches of bricks, as follows:

Instead of retarding the extraction of the salts by allowing the bricks and water to remain together after they are each equally charged with the salts, as above described, I use the same water as a bath for successive batches of bricks, using the water that has been most used, and as a consequence most highly charged with the salts, for the fresh batches of the bricks. As the fresh bricks which have not been immersed in water contain more of the salts than bricks which have been immersed, (and thereby have lost a portion of the salts which they originally contained,) I place the fresh batches of bricks in the water which has been the most used for immersing other batches of the bricks and which has become the most strongly impregnated with the salts. By so doing I obtain a very strong solution of the soluble salts, and one that is valuable as an article of commerce. This method also requires a less quantity of water than would otherwise be used, and thereby saves expense in cities and places where water has to be purchased.

In some of the materials which I sometimes use as equivalents of the ashes mentioned for making unburned bricks by my new process, such as pulverized brick rubbish or tufa ashes, (described in my patent of November 30, 1886, No. 353,501,) there is an abundance of soluble silica, but only a very small amount of soluble salts, or in some cases none at all. In such cases I hasten the chemical action between the silica and the lime or cement by adding soluble alkaline salts (such as are naturally contained in ordinary wood or coal ashes) to the water bath, although without such addition of soluble salts the chemical action will in time be perfectly accomplished by using a bath of fresh water only. The chemical action between the said silica and the lime or cement will be still further accelerated by heating the said baths to any degree less than the boiling-point. This may sometimes be economically done where there is waste steam that cannot be otherwise utilized.

In the ordinary production of thoroughly-hardened bricks manufactured under my processes each batch of bricks should be left in water five or six months. As, however, the bricks are often required for more immediate use, it is often an object to finish them much sooner than can be done if lime only is used as hereinbefore described. When the demand for the earlier use of the bricks is sufficiently urgent to warrant the extra expense of so doing, I use Portland or other quick-setting cement instead of lime to mix with the ashes, or their equivalents, and then change the water of the baths very often, so as to extract the soluble salts in a very short time. A perfect union between the cement and the ashes or their equivalents will take place in much less time than will the combination between the lime and the ashes or their equivalents, and good bricks will still be produced with less loss of time but at greater expense of money.

Having thus described my invention, what I claim, and desire to secure by Letters Patent, is—

The improvement herein described in the process of manufacturing brick made of ashes and lime or their equivalents, which consists in hardening and in cleansing the bricks from soluble alkaline matter by immersion in a succession of liquor baths the waters of which contain relatively-diminishing quantities of soluble salts or alkalies, substantially as described.

In witness whereof I have hereunto set my hand.

ERNEST LESLIE RANSOME.

Witnesses:
F. J. THOMPSON,
S. B. CUSHING.